B. MAGO.
PORTABLE ROTARY ROASTER.
APPLICATION FILED MAY 22, 1914.
1,134,343.
Patented Apr. 6, 1915.
2 SHEETS—SHEET 1.
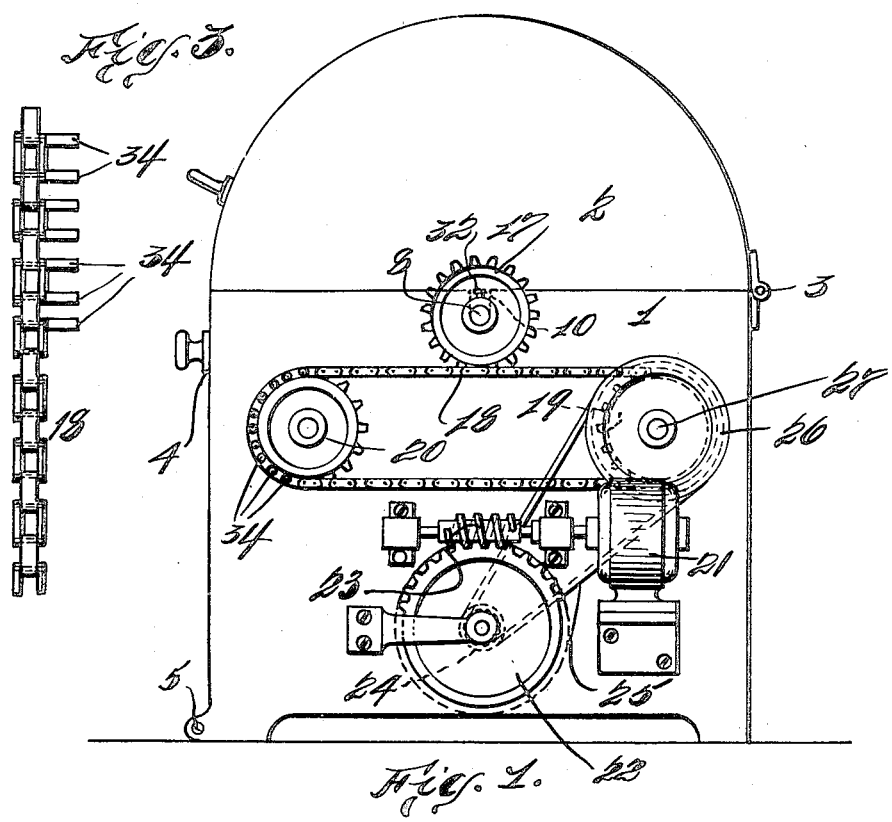
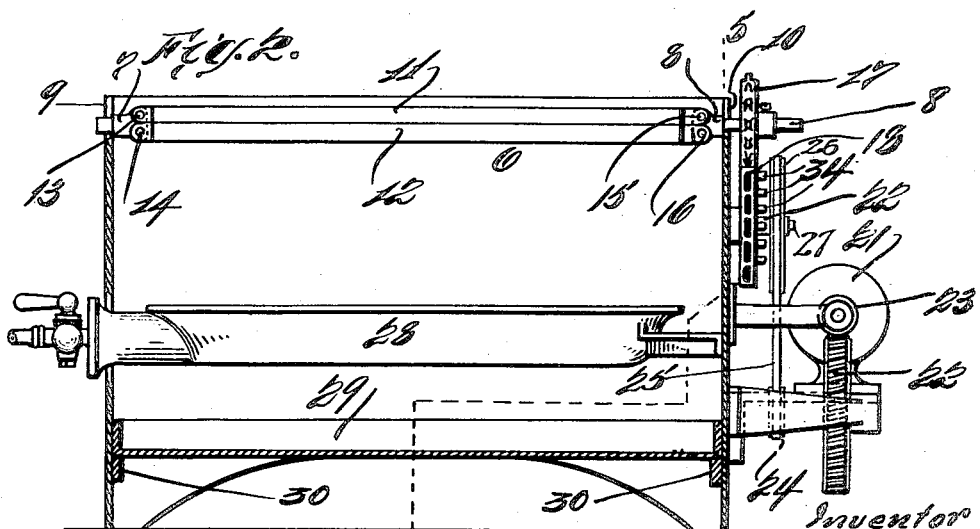
Witnesses
F. A. Jarvis
Edna Nathan
Inventor
Bartolomeo Mago
by Maurice Bloch
attorney

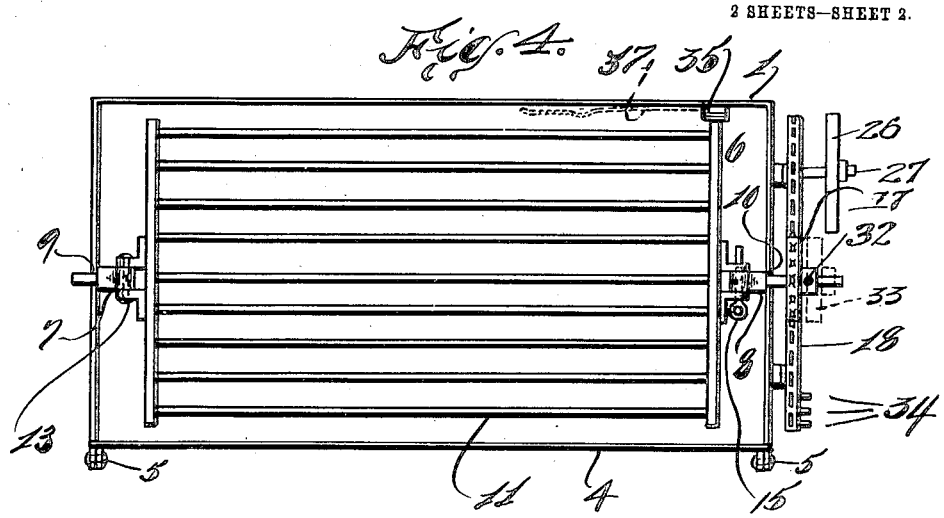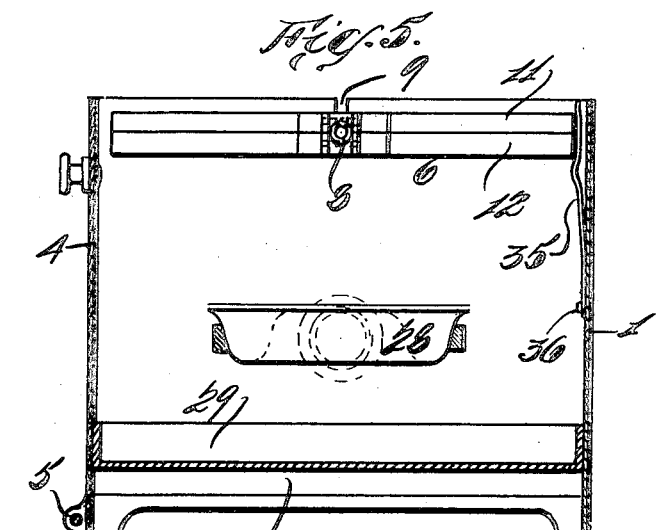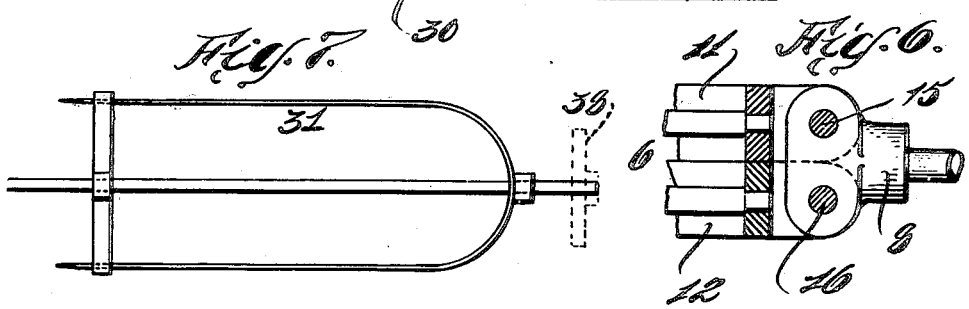

UNITED STATES PATENT OFFICE.

BARTOLOMEO MAGO, OF NEW YORK, N. Y., ASSIGNOR OF ONE-HALF TO PETER CARBONE, OF BROOKLYN, NEW YORK.

PORTABLE ROTARY ROASTER.

1,134,343.   Specification of Letters Patent.   Patented Apr. 6, 1915.

Application filed May 22, 1914. Serial No. 840,145.

*To all whom it may concern:*

Be it known that I, BARTOLOMEO MAGO, a subject of the King of Italy, residing at New York city, Manhattan borough, county and State of New York, have invented certain new and useful Improvements in Portable Rotary Roasters, of which the following is a full, clear, and exact description.

This invention relates to an improvement in roasting and broiling devices, the object being to provide a portable cooking device of this nature by which means steaks, chops, fish, fowl or the like can be cooked and turned automatically while being cooked.
My improved cooking device consists essentially of a suitable casing provided with a rotatable frame adapted to hold steaks, chops, fish, fowl or the like employing novel means for rotating the frame constantly or intermittently as circumstances require.

Further features of improvement will hereinafter appear.

I will now proceed to describe my invention in detail, the novel points of which I will set forth in the appended claims, reference being had to the accompanying drawings, forming part hereof, wherein:

Figure 1 is an end view of my improved device; Fig. 2 is a longitudinal sectional view thereof, the cover being removed. Fig. 3 is a fragmentary plan view of the sprocket chain which forms part of my improvement; Fig. 4 is a top plan view of my improved device, the cover and power mechanism being omitted; Fig. 5 is a cross-sectional view, the section being taken on a line 5—5 in Fig. 2. Fig. 6 is an enlarged detail sectional view of one end of the broiling frame; and Fig. 7 is a plan view of a spit for broiling fowl.

As herein embodied my improved cooking device consists of a casing 1 having a cover 2 hinged thereto at 3 and a door 4 hinged at 5. Within the casing 1, I rotatably mount a frame 6 having trunnions 7 and 8 resting in sockets 9 and 10, respectively, in the end walls of the casing.

The frame herein illustrated by 6 is used for broiling meat or fish and consists (in this instance) of two members 11 and 12 secured, at the ends, to the trunnions 7 and 8. In order that the members 11 and 12 can be separated for the insertion therebetween of the meat or fish, I hinge the same to one of the trunnions 7 (for instance) by means of pivots 13 and 14. The opposite end of each frame is likewise secured to the trunnion 8 by removable pins 15 and 16. When either the pin 15 or 16 is removed the member secured thereby can be swung away from its adjacent frame-member, at which time the meat or fish can be laid upon the under frame-member, the one left undisturbed, and the upper member closed and fastened to hold the meat or fish securely between the frame-members 11 and 12.

To rotate the frame, I provide one of the trunnions (8 for instance) with a sprocket pulley 17 meshing with a sprocket chain 18 carried by the sprocket pulleys 19 and 20 (Fig. 1). The chain 18 is caused to travel by means of a motor 21 which actuates a worm-gear 22 by means of a worm 23. The gear 22 actuates a belt pulley 24 carrying a belt 25 passing around a pulley 26 on the shaft 27 for the sprocket pulley 19.

When the chain 18 is caused to travel, by the rotation of the motor and gearing, the sprocket-pulley 17 will rotate, thereby causing the frame 6 to rotate, whereby the meat or fish thereon will be slowly cooked by the heat from a burner 28. During the process of cooking the meat or fish upon the frame 6 will be slowly turned, thereby causing the same to be gradually or evenly cooked. To catch the gravy or juices, I provide a removable pan 29 resting upon brackets 30 located on the end walls of the casing 1.

One of the features of my invention is the means for rotating the cooking frame either constantly or intermittently to cook or broil different kinds of meat or fowl. As long as the sprocket-pulley 17 is in mesh with the chain 18 the frame 6 will rotate constantly. To rotate the frame 6 or spit 31 (Fig. 7) intermittently I would release the set-screw 32 in the pulley 17, and move the pulley 17 outwardly to the position shown by dotted lines 33 (Fig. 4) in which position the pulley 17 would be in line to mesh with the projecting studs or pins 34 on the chain 18. When the pulley 17 is moved to the position mentioned, the frame 6 will not rotate until the studs 34 mesh with the pulley 17, at which time the frame will be given one half a revolution, there being a sufficient number of the studs 34 to accomplish this result. To prevent the frame 6 from turning, by gravity or otherwise, during the periods between the meshing of the pulley 17 and studs 34, the frame 6 will remain in contact with a resilient locking device 35, which keeps the frame 6 in a horizontal position between the periods of rotation by the studs 34. At about the time that the last stud 34 leaves the pulley 17 the frame will come in contact with the lock 35. When not in use the lock 35 can be moved upon its pivot 36 to the dotted line position 37, at which time the frame 6 can be constantly rotated by the chain 18.

To roast fowl I employ the spit 31 (Fig. 7) which can be placed in the pockets 9 and 10 in the casing, one end of the spit being provided with the pulley 17 after it has been removed from the frame 6.

If desirable the frame 6 and spit 31 may each be provided with a sprocket-pulley fixed thereto, the pulley on the frame 6 being positioned to mesh with the chain 18 and the pulley on the spit 31 being positioned to mesh with the studs 34 (see, for instance, dotted lines 38, Fig. 7).

Having now described my invention what I claim and desire to secure by Letters Patent is:

1. A broiling or roasting device consisting of a support, a frame rotatably supported thereby, a sprocket pulley carried by said frame, a sprocket chain meshing with said pulley, means for driving said chain constantly and means arranged to mesh with said sprocket pulley at intervals to drive said frame intermittently.

2. A broiling or roasting device consisting of a support, a frame rotatably supported thereby, a slidable sprocket-pulley carried by said frame, a sprocket chain adapted to mesh with said pulley, means adapted to actuate said chain constantly, and means carried by said chain adapted to mesh with said pulley at intervals whereby said frame is intermittently actuated.

3. A roasting and broiling device consisting of a support, a rotatable frame carried thereby, a sprocket chain, studs projecting therefrom throughout a portion of its length, means to actuate said chain, and a pulley slidably mounted on said frame adapted to mesh with said chain or the studs carried thereby.

4. A roasting and broiling device consisting of a support, a rotatable frame carried thereby, a sprocket chain, studs projecting therefrom throughout a portion of its length, means to actuate said chain, a pulley slidably mounted on said frame adapted to mesh with said chain or the studs carried thereby and a resilient lock adapted to hold said frame stationary between the periods of intermittent rotation.

5. A roasting and broiling device consisting of a casing, a rotatable frame located within the same and supported thereby, a sprocket chain, studs projecting therefrom throughout a portion of its length, means to actuate said chain, a pulley slidably mounted on said frame adapted to mesh with said chain or the studs carried thereby and a resilient lock adapted to hold said frame stationary between the periods of intermittent rotation.

6. A roasting and broiling device consisting of a casing, a rotatable frame located within the same and supported thereby and consisting of a plurality of hinged members, a sprocket chain, studs projecting therefrom throughout a portion of its length, means to actuate said chain, a pulley slidably mounted on said frame adapted to mesh with said chain or the studs carried thereby and a resilient lock adapted to hold said frame stationary between the periods of intermittent rotation.

7. A broiler or roaster consisting of a rotatable frame and means to rotate said frame constantly or intermittently as preferred, the said means comprising a gear wheel movable to occupy either one of two positions and an element of gearing adapted to engage said wheel in two different ways for the two kinds of rotary movement thus required.

8. A roasting and broiling device comprising a support, a sprocket chain movably supported thereon, means to actuate the chain, means located on said support to support a broiling frame and a gear carried by the broiling frame, said gear and chain being adapted to engage each other by either one of two engagements, for continuous or intermittent operation as preferred, one of these two parts last named being movable from either one of the positions of engagement to the other.

Signed at New York city, N. Y., this 21st day of May, 1914.

BARTOLOMEO MAGO.

Witnesses:
EDWARD A. JARVIS,
MAURICE BLOCK.